SEPARATION OF NAPHTHOL ISOMERS
David W. Peck, Charleston, W. Va., assignor to Union
Carbide Corporation, a corporation of New York
No Drawing. Filed Sept. 10, 1958, Ser. No. 760,101
5 Claims. (Cl. 260—621)

This invention relates to an improved method for separating 1-naphthol from admixture with 2-naphthol.

When naphthol occurs in natural products, such as the phenolic portion of coal tar or coal hydrogenation product, it occurs as a mixture of the two isomers, 1-naphthol and 2-naphthol. And when naphthol is synthesized by commercially economical methods, as for example by the liquid phase caustic hydrolysis of 1-chloronaphthalene, a mixture of the two isomers results. Many uses of naphthol require a particular isomer alone and hence separation is necessary.

The boiling point temperature of 1-naphthol is 279° C. and that of 2-naphthol is 285° C., only six degrees higher, so that separation of the two by distillation is difficult to achieve and requires an expensive distillation column of many theoretical plates, the use of which is not ordinarily considered commercially practicable. The freezing points of the two isomers are not so close as the boiling points, being 96° C. for 1-naphthol and 122° C. for 2-naphthol, so that some separation can be achieved by fractional crystallization. This latter technique, however, requires a large number of stages before good yields of high purity compounds can be obtained, and is therefore a commercially undesirable means of making the separation.

The two isomers of naphthol differ structurally only in the position of the hydroxyl group on the naphthalene nucleus, and are therefore almost identical chemically. In nearly all cases, therefore, both isomers react with a given compound in exactly the same manner. I have now discovered, however, that this identity of reaction does not obtain in the case of the alkali metal hydroxides. A dilute aqueous solution of an alkali metal hydroxide will preferentially react with 1-naphthol under certain conditions. Suitable alkali metal hydroxides include sodium hydroxide, potassium hydroxide and lithium hydroxide. This preferential reaction with 1-naphthol occurs if the relative quantity of hydroxide is kept low so that the naphthols must compete with it and if enough time is allowed for a chemical equilibrium status to be approached. The time required varies with the temperature employed, with higher temperatures resulting in a shorter period of time.

In a preferred embodiment of the invention a naphthol mixture is added to a dilute sodium hydroxide solution and the resulting mixture is maintained at reflux temperature for a period of one to five hours. The quantity of sodium hydroxide used is limited to approximately the amount needed to react with all of the 1-naphthol present. After the period of refluxing is completed the mixture is allowed to cool, whereupon the 2-naphthol precipitates and is recovered by filtration. A quantity of carbon dioxide in stoichiometric excess of the quantity required to neutralize the sodium present is then bubbled through the filtrate. This causes the 1-naphthol to precipitate and it is recovered by filtration.

The process of the invention can be used on naphthol mixtures regardless of source, whether natural or synthetic.

While sodium hydroxide is the preferred reagent, potassium hydroxide may also be employed. The relative quantity of alkali metal hydroxide employed can be varied within certain limits according to the results desired. Per mol of 1-naphthol present in the mixture, at least 0.5 mol but not more than 1.5 mols of alkali metal hydroxide is employed. If enough or slightly more than enough hydroxide to react with all the 1-naphthol is used, 2-naphthol of good purity can be obtained, but the 1-naphthol recovered will contain some 2-naphthol. If less than enough hydroxide to react with all the 1-naphthol is employed, the 1-naphthol recovered will be of good purity but the 2-naphthol recovered will contain some 1-naphthol.

In addition to the quantity of alkali metal hydroxide used, the concentration of the hydroxide in the aqueous medium is also very important to the success of the process of the invention. Preferably, the concentration of the hydroxide is less than 0.1 molar. At higher molarities the efficiency of the separation decreases, although some separation can be achieved at concentrations as high as 1.0 molar.

While it is preferred to maintain the reaction mixture at reflux temperature, about 100° C., heating is not essential to the process. If heat is not applied, however, a longer reaction time, as much as thirty hours or more, will be required. If the reaction mixture is not maintained at reflux temperature, then the agitation provided by refluxing is preferably supplied by other means such as stirring. Agitation is desirable in order to reach equilibrium as quickly as possible.

After the 2-naphthol has been recovered by filtration it is preferred to recover the 1-naphthol from the caustic solution by neutralization of the sodium with carbon dioxide, inasmuch as this results in the precipitation of 1-naphthol as a solid which can be readily recovered by filtration. It is quite possible, however, to carry out this neutralization with other acids such as sulfur dioxide, sulfur trioxide, sulfuric acid, acetic acid, hydrochloric acid or the like. When such acids are used it may be found desirable to extract the liberated 1-naphthol from the aqueous medium with an organic solvent such as benzene, toluene, ethyl ether, isopropyl ether or the like. When such an organic solvent is employed the 1-naphthol may be conveniently recovered from the extract by distillation.

*Example I*

A mixture of 10 grams (0.07 mol) of 1-naphthol, 10 grams (0.07 mol) of 2-naphthol, 2.8 grams (0.07 mol) of sodium hydroxide pellets and one liter of water was charged to a two-liter glass kettle and maintained at a temperature of about 100° C. for a period of four hours, whereby the mixture underwent continuous reflux during this period. At the end of the four hours the mixture was allowed to cool to ambient temperature and naphthol crystals formed. These crystals were recovered by filtration, washed with water and dried. The dried crystals weighed six grams and spectrometric analysis showed the crystals to be 98 percent 2-naphthol and 2 percent 1-naphthol.

The liquid remaining after the above-described removal of crystals by filtration was treated by bubbling carbon dioxide through the mixture in a stoichiometric excess of the amount required to neutralize the sodium present. This resulted in the precipitation of naphthol crystals. These crystals were recovered by filtration, washed with water and dried. The dried crystals weighed ten grams and spectrometric analysis showed the crystals to be 76 percent 1-naphthol and 24 percent 2-naphthol.

*Example II*

A mixture of 10 grams (0.07 mol) of 1-naphthol, 10 grams (0.07 mol) of 2-naphthol, 2.5 grams (0.063 mol) of sodium hydroxide pellets and 100 milliliters of water was charged to a two-liter glass kettle and maintained at a temperature of about 100° C. for a period of four hours, whereby the mixture underwent continuous reflux during this period. At the end of the four hours the mixture was allowed to cool to ambient temperature and naphthol crystals formed. These crystals were recovered by filtration, washed with water and dried. The dried crystals weighed twelve grams and spectrometric analysis showed the crystals to be 71 percent 2-naphthol and 29 percent 1-naphthol.

The liquid remaining after the above-described removal of crystals by filtration was treated by bubbling carbon dioxide through the mixture in a stoichiometric excess of the amount required to neutralize the sodium present. This resulted in the precipitation of naphthol crystals. These crystals were recovered by filtration, washed with water and dried. The dried crystals weighed eight grams and spectrometric analysis showed the crystals to be 72 percent 1-naphthol and 28 percent 2-naphthol.

*Example III*

A mixture of 10 grams (0.07 mol) of 1-naphthol, 10 grams (0.07 mol) of 2-naphthol, 3 grams (0.054 mol) of potassium hydroxide pellets and 500 milliliters of water was charged to a two-liter glass kettle and maintained at a temperature of about 100° C. for a period of 2.25 hours, whereby the mixture underwent continuous refluxing during this period. At the end of the 2.5 hours the mixture was allowed to cool to ambient temperature and naphthol crystals formed. The crystals were recovered by filtration, washed with water and dried. The dried crystals weighed six grams and spectrometric analysis showed the crystals to be 69 percent 2-naphthol and 31 percent 1-naphthol.

The liquid remaining after the above-described removal of crystals by filtration was treated by bubbling carbon dioxide through the mixture in a stoichiometric excess of the amount required to neutralize the potassium present. This resulted in the precipitation of naphthol crystals. These crystals were recovered by filtration, washed with water and dried. The dried crystals weighed eleven grams and spectrometric analysis showed the crystals to be 82 percent 1-naphthol and 18 percent 2-naphthol.

*Example IV*

A mixture of 10 grams (0.07 mol) of 1-naphthol, 10 grams (0.07 mol) of 2-naphthol, 2.5 grams (0.063 mol) of sodium hydroxide pellets and one liter of water was charged to a two-liter flask and agitated vigorously for a period of twenty hours at a temperature of 25° C. At the end of this period the mixture consisted of a finely divided solid phase suspended in the liquid phase. The solid was recovered by filtration, washed with water and dried. The dried solids weighed 7.5 grams and spectrometric analysis showed the solids to be 85 percent 2-naphthol and 15 percent 1-naphthol.

The liquid remaining after the above-described removal of solids by filtration was treated by bubbling carbon dioxide through the mixture in a stoichiometric excess of the amount required to neutralize the sodium present. This resulted in the precipitation of naphthol crystals. These crystals were recovered by filtration, washed with water and dried. The dried crystals weighed 7.5 grams and spectrometric analysis showed the crystals to be 70 percent 1-naphthol and 30 percent 2-naphthol.

*Example V*

A mixture of 20 grams (0.14 mol) of 1-naphthol, 20 grams (0.14 mol) of 2-naphthol, 2 grams (0.05 mol) of sodium hydroxide pellets and 120 milliliters of water was charged to a two-liter glass kettle and maintained at a temperature of about 100° C. for a period of four hours, whereby the mixture underwent continuous reflux during this period. At the end of the four hours the mixture was allowed to cool to ambient temperature and naphthol crystals formed. These crystals were recovered by filtration, washed with water and dried. The dried crystals weighed 21 grams and spectrometric analysis showed the crystals to be 73 percent 2-naphthol and 27 percent 1-naphthol.

The liquid remaining after the above-described removal of crystals by filtration was treated by bubbling carbon dioxide through the mixture in a stoichiometric excess of the amount required to neutralize the sodium present. This resulted in the precipitation of naphthol crystals. These crystals were recovered by filtration, washed with water and dried. The dried crystals weighed 17 grams and spectrometric analysis showed the crystals to be 70 percent 1-naphthol and 30 percent 2-naphthol.

*Example VI*

A mixture of 10 grams (0.07 mol) of 1-naphthol, 10 grams (0.07 mol) of 2-naphthol, 2 grams (0.05 mol) of sodium hydroxide pellets and one liter of water was charged to a two-liter glass kettle and maintained at a temperature of about 100° C. for a period of four hours, whereby the mixture underwent continuous reflux during this period. At the end of the four hours the mixture was allowed to cool to ambient temperature and naphthol crystals formed. These crystals were recovered by filtration, washed with water and dried. The dried crystals weighed 10 grams and spectrometric analysis showed the crystals to be 78 percent 2-naphthol and 22 percent 1-naphthol.

The liquid remaining after the above-described removal of crystals by filtration was treated by bubbling carbon dioxide through the mixture in a stoichiometric excess of the amount required to neutralize the sodium present. This resulted in the precipitation of naphthol crystals. These crystals were recovered by filtration, washed with water and dried. The dried crystals weighed six grams and spectrometric analysis showed the crystals to be 82 percent 1-naphthol and 18 percent 2-naphthol. After the recovery of the crystals by filtration there remained about one liter of final filtrate which was retained for us in Example VIII.

*Example VII*

A mixture of 10 grams (0.07 mol) of 1-naphthol, 10 grams (0.07 mol) of 2-naphthol, 2.8 grams (0.07 mol) of sodium hydroxide pellets and one liter of water was charged to a two-liter glass kettle and maintained at a temperature of about 100° C. for a period of four hours, whereby the mixture underwent continuous reflux during this period. At the end of the four hours the mixture was allowed to cool to ambient temperature and naphthol crystals formed. These crystals were recovered by filtration, washed with water and dried. The dried crystals weighed seven grams and spectrometric analysis showed the crystals to be 93 percent 2-naphthol and 7 percent 1-naphthol.

To the liquid remaining after the above-described removal of crystals by filtration there was added sufficient hydrochloric acid to neutralize the sodium present. The liquid was then extracted successively with one 200-milliliter and two 100-milliliter portions of isopropyl ether. The three ether extracts thus obtained were combined and then washed with water. The ether was then evaporated from the combined extracts to yield 12 grams of naphthol crystals. These crystals were washed with water and dried. The dried crystals weighed twelve grams and spectrometric analysis showed the crystals to be 73 percent 1-naphthol and 27 percent 2-naphthol.

*Example VIII*

A mixture of 10 grams (0.07 mol) of 1-naphthol, 10 grams (0.07 mol) of 2-naphthol, 2 grams (0.05 mol) of sodium hydroxide pellets and about one liter of the final filtrate from Example VI was charged to a two-liter glass kettle and maintained at a temperature of about 100° C. for a period of four hours, whereby the mixture underwent continuous reflux during this period. At the end of the four hours the mixture was allowed to cool to ambient temperature and naphthol crystals formed. These crystals were recovered by filtration, washed with water and dried. The dried crystals weighed six grams and spectrometric analysis showed the crystals to be 89 percent 2-naphthol and 11 percent 1-naphthol.

The liquid remaining after the above-described removal of crystals by filtration was treated by bubbling carbon dioxide through the mixture in a stoichiometric excess of the amount required to neutralize the sodium present. This resulted in the precipitation of naphthol crystals. These crystals were recovered by filtration, washed with water and dried. The dried crystals weighed nine grams and spectrometric analysis showed the crystals to be 63 percent 1-naphthol and 37 percent 2-naphthol.

What is claimed is:

1. Process for resolving a mixture of 1-naphthol and 2-naphthol which comprises agitating the naphthol mixture in a less than about 0.4 normal aqueous solution of an alkali metal hydroxide, the quantity of said hydroxide present being about equal to the amount required to react with all of the 1-naphthol in said mixture, permitting the thus-formed mixture to approach chemical equilibrium, whereby said 1-naphthol dissolves in solution, recovering said 2-naphthol, neutralizing said solution to liberate said 1-naphthol from solution and recovering said 1-naphthol.

2. Process for resolving a mixture of 1-naphthol and 2-naphthol which comprises agitating the naphthol mixture in a less than 0.1 normal aqueous solution of an alkali metal hydroxide, the quantity of said hydroxide present being about equal to the amount required to react with all of the 1-naphthol in said mixture, permitting the thus-formed mixture to approach chemical equilibrium, whereby said 1-naphthol dissolves in solution, recovering said 2-naphthol neutralizing said solution to liberate said 1-naphthol from said solution and recovering said 1-naphthol.

3. Process for resolving a mixture of 1-naphthol and 2-naphthol which comprises agitating the naphthol mixture in a less than about 0.4 normal aqueous solution of an alkali metal hydroxide selected from the group consisting of sodium hydroxide and potassium hydroxide, the quantity of said hydroxide present being about equal to the amount required to react with all of the 1-naphthol in said mixture, permitting the thus-formed mixture to approach chemical equilibrium, whereby said 1-naphthol dissolves in said solution, recovering said 2-naphthol, neutralizing said solution to liberate said 1-naphthol from said solution and recovering said 1-naphthol.

4. Process for recovering relatively pure 1-naphthol from a naphthol mixture which comprises agitating said naphthol mixture in a less than about 0.4 normal aqueous solution of an alkali metal hydroxide, the quantity of said hydroxide present being slightly less than the stoichiometric quantity necessary to react with all of the 1-naphthol in said mixture, permitting the thus-formed mixture to approach chemical equilibrium, removing the precipitate formed, neutralizing the solution remaining to liberate said 1-naphthol from said solution and recovering said 1-naphthol.

5. Process for recovering relatively pure 2-naphthol from a naphthol mixture which comprises agitating said naphthol mixture in a less than about 0.4 normal aqueous solution of an alkali metal hydroxide, the quantity of said hydroxide present being slightly more than the stoichiometric quantity necessary to react with all of the 1-naphthol in said mixture, permitting the thus-formed mixture to approach chemical equilibrium, whereby said 1-naphthol dissolves in solution and recovering said 2-naphthol from said solution.

References Cited in the file of this patent

UNITED STATES PATENTS

| | | |
|---|---|---|
| 1,582,512 | Crawford | Apr. 27, 1926 |
| 1,717,009 | Davis | June 11, 1929 |
| 2,242,325 | Read | May 20, 1941 |

OTHER REFERENCES

Lauer: Ber. Deut. Chem., vol. 70 (1937), pages 1132–33 (2 pages; entire article pages 1127–33). (Patent Office Library.)